UNITED STATES PATENT OFFICE.

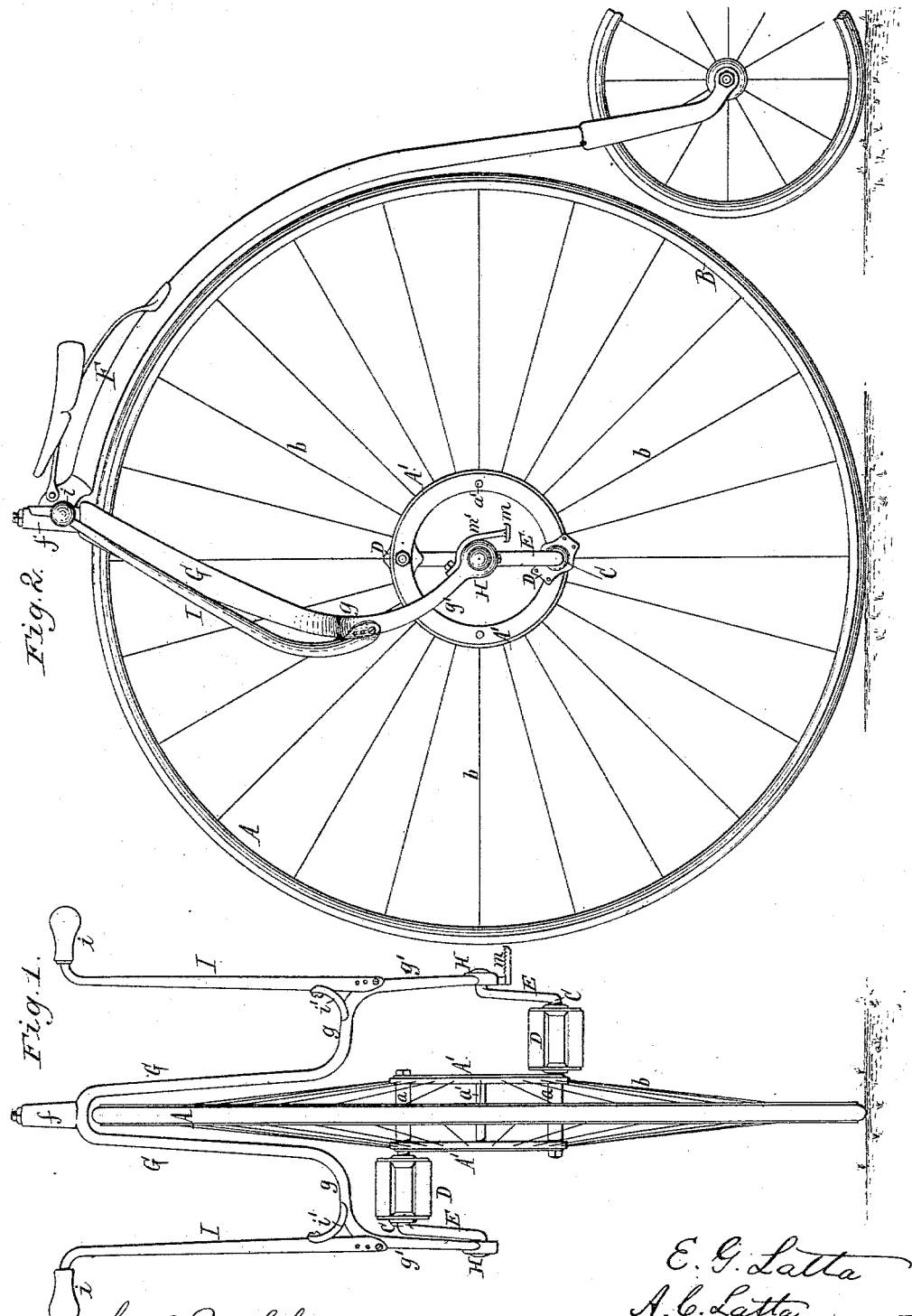

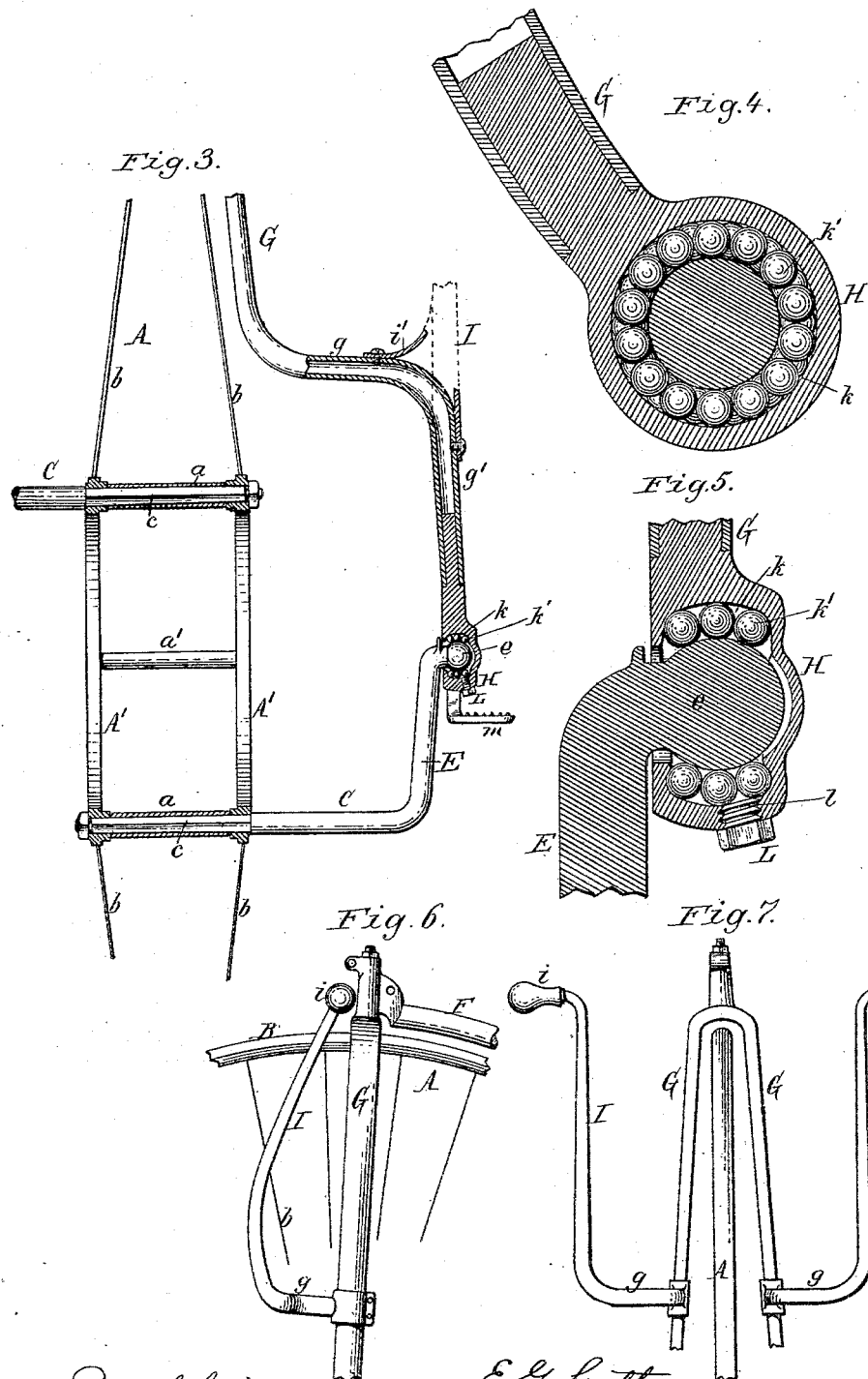

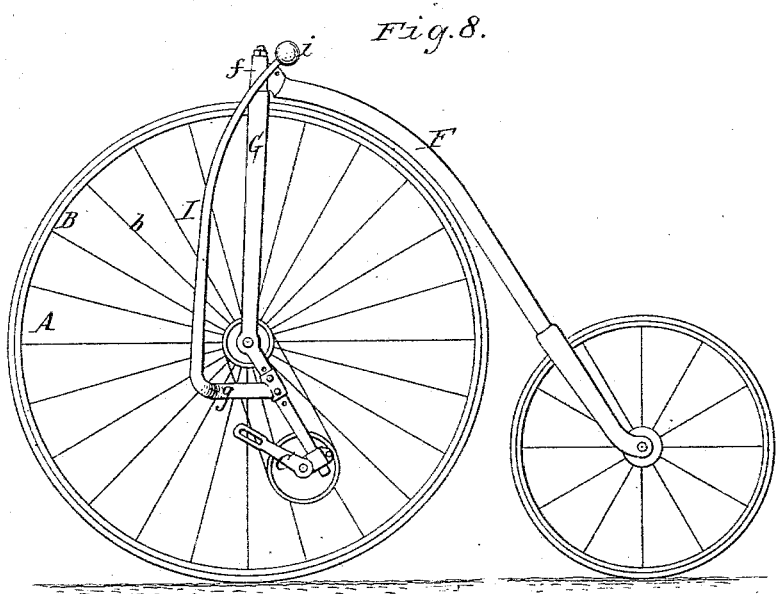

EMMIT G. LATTA AND ADRIAN C. LATTA, OF FRIENDSHIP, NEW YORK.

VELOCIPEDE.

SPECIFICATION forming part of Letters Patent No. 339,436, dated April 6, 1886.

Application filed September 21, 1885. Serial No. 177,675. (No model.)

*To all whom it may concern:*

Be it known that we, EMMIT G. LATTA and ADRIAN C. LATTA, of Friendship, in the county of Allegany and State of New York, have invented new and useful Improvements in Velocipedes, of which the following is a specification.

This invention relates to an improvement in velocipedes whereby a narrower tread is secured without reducing the spread of the spokes, and whereby the handle-bar is so formed as to permit the rider to free himself from the machine and strike on his feet in case of a fall, and whereby various other advantages are attained.

Our invention consists of the improvements which will be hereinafter fully set forth, and pointed out in the claims.

In the accompanying drawings, consisting of three sheets, Figure 1 is a front elevation of a bicycle provided with our improvements. Fig. 2 is a side elevation of the same. Fig. 3 is a cross-section of the central portion of the wheel and connecting parts. Fig. 4 is a longitudinal section, on an enlarged scale, of one of the bearings. Fig. 5 is a transverse section of the same. Fig. 6 is a side elevation, and Fig. 7 a front elevation showing the handle-bar applied to the fork-arms, of ordinary construction. Fig. 8 is a side elevation of a safety-bicycle with our improved handle-bars applied to the same.

Like letters of reference refer to like parts in the several figures.

A represents the front wheel, provided with a hub which is composed of two rings, A' A', arranged side by side and rigidly connected by cross-stays $a$ $a'$, so as to form a hub which is open at both ends.

$b$ represents the spokes which connect the rings A' A' with the rim B, and which may be of any ordinary or suitable construction.

C C are the cranks, which are secured to the hub-rings A' A' by means of shanks $c$, which extend through the tubular cross-stays $a$. The shanks $c$ are made angular, or are otherwise constructed so that they cannot turn in the rings A'.

D represents the pedals, which are applied to the cranks C in any suitable manner. The outer ends of the cranks C are provided with arms E, which extend inwardly toward the axis of the wheel from the outer ends of the cranks, and are provided in the axial line of the wheel with spherical knuckles or journals $e$.

F represents the backbone, and $f$ the steering-head.

G represents the fork-arms, extending downwardly and forwardly from the steering-head on both sides of the wheel A as closely as practicable to a short distance above the pedals when in their highest position, at which points the fork arms are turned outwardly to form foot-rests $g$. These horizontal portions of the fork-arms extend outwardly far enough to clear the crank-arms E, and then extend downwardly again toward the axial line of the wheel A, where they are provided with bearings H, in which the journals $e$ turn.

I represents the handle-bars, secured with their lower ends to the outer and lower portions, $g'$, of the fork-arms and extending upwardly to a convenient height, at which they are provided with outwardly-projecting handles $i$. The lower ends of the handle-bars I are secured to the fork-arms by a screw-bolt, which can be passed through one of a series of vertical openings, or in any other suitable manner, so that the handle-bars can be raised and lowered, thereby adjusting the position of the handles $i$.

$i'$ represents braces which connect the handle-bars with the horizontal portions $g$ of the fork-arms to further stiffen the handle-bars, if desired.

By journaling the wheel in the fork-arms outside of the pedals the latter are arranged closely against the side of the wheel, and the rider's feet are brought closer together than when the pedals and cranks are arranged outside of the bearing without narrowing the spread of the spokes. If the rider overbalances from any cause, or is about to fall forward, he has but to raise his feet slightly over the foot-rests and put them out in front, retaining his hold on the handles, when he will land on his feet free from the machine and in a position to run forward a few steps, thereby avoiding injury to himself or the machine. In the act of falling forward the horizontal portions $g$ of the fork-arms move downwardly and forwardly, which renders their position still more favorable for the rider to clear them with his feet. In coasting downhill the rider's feet are placed upon these horizontal portions $g$, which form convenient foot-rests, and from which he can easily replace his feet on the pedals when necessary, or jump to the ground in case of a fall. When the rider has his feet on the foot-rests $g$, he can steer the machine by his feet, and he retains the machine under better control, and is in a more convenient position in coasting than when placing his legs over the ordinary handle-bars. The fork-arms are bent forwardly, whereby the horizontal portions or foot-rests $g$ are arranged so far forwardly from the center of the wheel A that the rider can work the pedals without striking against the foot-rests. The handle-bars I are also bent forwardly in the same manner, to permit the rider's knees to clear the handle-bars in case of a side fall. The fork-arms are preferably constructed of tubing tapered and bent to the form shown, and the bearing-boxes H are provided with shanks or lugs, which are secured in the lower ends of the tubular fork-arms by brazing or other suitable means. The handle-bars are also preferably constructed of tubing.

Our improved handle-bars can be easily applied to velocipedes of ordinary construction by securing the lower ends of the handle-bars to the fork-arms, as represented in Figs. 6 and 7, and bending the lower portions of the handle-bars outwardly and forwardly to form the foot-rests $g$, which are formed in this case in one piece with the handle-bars. The latter can also be applied to safety-bicycles of ordinary construction by securing their lower ends to the fork-extensions below the center of the wheel, as represented in Fig. 8.

It is obvious that the construction of the handle-bars may be modified in various ways without departing from the spirit of the invention—for instance, by forming the fork-arms, foot-rests $g$, and handle-bars I in one piece and securing the arms $g'$, which carry the bearings, to the same; also, that the foot-rests may be arranged higher up or lower down, as the machine may be designed for the use of riders of greater or less activity.

We are aware that handle-bars which are secured at their upper ends to the lower part of the head and extend backwardly and downwardly under the rider's legs, and then outwardly and forwardly in a position for use, are not new; but they are different from our invention, as they are difficult to mount and confine the rider in case of a side fall. We are also aware that the forks have been extended below the cranks, and then outwardly and upwardly to form handle-bars; but these are different in construction, heavier, and less rigid than our improved construction, and they are in the way in case of side falls, and do not form convenient foot-rests.

The journals H are constructed with spherical sockets or grooves $k$, which receive balls $k'$. The latter are introduced into these grooves through an opening, $l$, which is closed after the introduction of the balls by a screw, L. The balls $k$ confine the spherical journal in the bearings, and the spherical sockets and bearings form a universal joint, which permits of a limited movement of the journals in the bearings without binding, thereby permitting the bearing to twist on the journal and align itself properly under all circumstances. The balls are all arranged in the same socket or groove, whereby they are permitted to run together, and if looseness of the parts should occur by wear it can be taken up by inserting one or more additional balls. This bearing is applicable to ordinary velocipedes by simply forming an opening in the outer or closed side of the bearing for the purpose of passing the journal through the same.

When it is desired to carry luggage, it is rolled up in a bundle and put into the hollow center of the wheel A through one of the open rings A', and secured in place by straps or other suitable means. A cylindrical casing may be constructed and secured in the hollow center of the wheel for the reception of the luggage.

If it is desired to carry a hub-lamp or cyclometer in the center of the wheel, a light metallic frame is secured centrally in the rings A' to form a support for the same.

$m$ represents the step, provided with an arm, $m'$, which overlaps the bearing H, and is secured to the lower end of the fork-arm $g'$. This step is located in rear of the center of the wheel and affords a safer means for mounting and dismounting than the usual step on the backbone.

We claim as our invention—

1. In a velocipede-wheel, the combination, with the rim and spokes, of an annular hub constructed with unobstructed open ends, and cranks secured to the hub outside of the axis thereof, whereby the hub is adapted to receive luggage, &c., substantially as set forth.

2. The combination, with the wheel and fork, of cranks secured with their inner ends to the wheel, and provided at their outer ends with arms which are journaled in the fork-arms, substantially as set forth.

3. The combination, with the wheel having an annular hub and the fork-arms, of cranks secured to the hollow hub, and provided at their outer ends with arms which are journaled in the fork-arms, substantially as set forth.

4. The combination, with the wheel and fork-arms, of cranks secured to the wheel, pedals mounted on the cranks between the wheel and fork-arms, and journal-arms formed at the outer ends of the cranks, and journaled in bearings in the fork-arms outside of the pedals, substantially as set forth.

5. The combination, with the wheel, of fork-arms having their lower ends provided with spherical bearings, and cranks secured with their inner ends to the wheel, and provided at their outer ends with arms which terminate in spherical journals, substantially as set forth.

6. The combination, with the wheel provided with cranks, of a fork having its arms composed of upper portions, which are arranged closely against the sides of the wheel, outwardly-projecting portions $g$, forming foot-rests, and outer depending portions, $g'$, provided with journal-bearings, substantially as set forth.

7. The combination, with the crank-wheel, of fork-arms curved or bent forwardly from the center of the wheel, and upright handle-bars secured with their lower ends to the forwardly-curved portion of the fork-arms, and arranged at a suitable distance outwardly from the fork-arms, to permit the rider's legs to pass between the handle-bars and fork-arms, whereby the rider's legs are prevented from coming in contact with the bars which connect the handle-bars and fork-arms, substantially as set forth.

8. The combination, with the fork-arm and upright handle-bar, of a connecting foot-rest, $g$, arranged above the crank-wheel bearings, substantially as set forth.

9. The combination, with the fork-arm provided with an outwardly-turned lower portion, $g$, and a depending arm, $g'$, of an upright handle-bar, I, secured with its lower portion to the arm $g'$, substantially as set forth.

10. The combination, with the wheel provided with cranks which carry journals at their outer ends, of a fork having its upper portions arranged closely against the wheel and provided with outwardly-turned portions, which extend over the cranks and terminate in depending arms provided with bearings, and upright handle-bars secured with their lower ends to the fork-arms at a suitable distance outwardly, to permit the rider's legs to pass between the fork and handle-bars, substantially as set forth.

11. The combination, with the wheel and fork, of an upright handle-bar arranged outwardly from the fork, and having its lower end made vertically adjustable on the fork, substantially as set forth.

12. The combination, with the spherical journal, of a grooved or recessed bearing surrounding the journal, and several rows of balls arranged in the groove of the bearing side by side, and in contact with each other, whereby the spherical journal is supported in the bearing, substantially as set forth.

13. The combination, with the fork provided with a spherical bearing having an opening in one side, of a spherical journal inserted in the bearing through said opening, and balls interposed between the bearing and the journal, substantially as set forth.

14. The combination, with the fork having a lower portion, $g$, arranged outside of the pedal, of a step secured to said lower portion of the fork, substantially as set forth.

Witness our hands this 6th day of September, 1885.

EMMIT G. LATTA.
ADRIAN C. LATTA.

Witnesses:
M. W. POTTER,
FRED. H. RICE.